United States Patent [19]

Valencia et al.

[11] Patent Number: 4,533,372
[45] Date of Patent: Aug. 6, 1985

[54] METHOD AND APPARATUS FOR SEPARATING CARBON DIOXIDE AND OTHER ACID GASES FROM METHANE BY THE USE OF DISTILLATION AND A CONTROLLED FREEZING ZONE

[75] Inventors: Jaime A. Valencia, Sugar Land; Robert D. Denton, Houston, both of Tex.

[73] Assignee: Exxon Production Research Co., Houston, Tex.

[21] Appl. No.: 565,089

[22] Filed: Dec. 23, 1983

[51] Int. Cl.³ .................................................. F25J 3/02
[52] U.S. Cl. ......................................... 62/12; 62/33; 62/42
[58] Field of Search ...................... 62/12–15, 62/24, 23, 32, 33, 42

[56] References Cited

U.S. PATENT DOCUMENTS 3,306,057  2/1967  Harmens .................................. 62/12

Primary Examiner—Frank Sever
Attorney, Agent, or Firm—E. Thomas Wheelock; David H. Vickrey

[57] ABSTRACT

The invention relates to method and apparatus for separating carbon dioxide and other acid gases from methane by treating the feedstream in at least one distillation zone and a controlled freezing zone. The freezing zone produces a carbon dioxide slush which is melted and fed into a distillation section. The apparatus used to practice the process is preferably in a single vessel.

76 Claims, 4 Drawing Figures

METHOD AND APPARATUS FOR SEPARATING CARBON DIOXIDE AND OTHER ACID GASES FROM METHANE BY THE USE OF DISTILLATION AND A CONTROLLED FREEZING ZONE

FIELD OF THE INVENTION

This invention is a method and apparatus for effectively separating acid gases, in particular carbon dioxide, from methane-containing gases by treating the gas in at least one distillation zone and a controlled freezing zone. The invention also pertains to apparatus suitable for practicing such a process.

BACKGROUND OF THE INVENTION

In the past few years, the price of natural gas for use as fuel and chemical feedstock has been steadily increasing. These higher prices have improved the economics of many gas prospects and encouraged the exploration for new reserves of natural gas. Many gas reservoirs, however, have relatively low percentage of hydrocarbons (less than 40% for example) and high percentages of acid gases, principally carbon dioxide, but also hydrogen sulfide, carbonyl sulfide, carbon disulfide, and various mercaptans.

Carbon dioxide acts as a diluent and, in the amount noted above, significantly lowers the heat content of the natural gas. The sulfur-bearing compounds are noxious and may be lethal. In addition, in the presence of water, these components render the gas very corrosive. Clearly, it is desirable to remove acid gases to produce a sweet and concentrated natural gas having a heating value of near 1,000 BTU/SCF either for delivery to a pipeline or conversion to LNG.

The separation of carbon dioxide from methane is difficult and consequently significant work has been applied to the development of methane/carbon dioxide separation methods. These processes can be placed into four general classes: absorption by physical solvents, absorption by chemical solvents, adsorption by solids, and distillation.

Currently, cryogenic distillation is considered one of the most promising methods of separating acid gases, particularly carbon dioxide, from methane. The high relative volatility of methane with respect to carbon dioxide makes such processes theoretically very attractive. However, the methane/carbon dioxide distillative separation has what heretofore has been considered a significant disadvantage in that solid carbon dioxide exists in equilibrium with vapor-liquid mixtures of carbon dioxide and methane at particular conditions of temperature, pressure, and composition. Obviously, the formation of solids in a distillation tower has the potential for plugging the tower and its associated equipment. Increasing the operating pressure of the tower will result in warmer operating temperatures and a consequent increase in the solubility of carbon dioxide, thus narrowing the range of conditions at which solid carbon dioxide forms. However, additional increases in pressure will cause the carbon dioxide-methane mixture to reach and surpass its critical conditions. Upon reaching criticality, the vapor and liquid phases of the mixture are indistinguishable from each other and therefore cannot be separated. A single-tower distillative equilibrium separation operating in the vapor-liquid equilibrium region bounded between carbon dioxide freezing conditions and the carbon dioxide-methane critical pressure line may produce a product methane stream containing 10% or more carbon dioxide. By comparison, specifications for pipeline quality gas typically call for a maximum of 2%–4% carbon dioxide and specifications for an LNG plant typically require less than 100 ppm of carbon dioxide. Clearly, a distillative separation at the above conditions is unacceptable.

Various methods have been devised to avoid the conditions at which carbon dioxide freezes and yet obtain an acceptable separation. Processes which utilize additives to aid in the separation are disclosed in U.S. Pat. No. 4,149,864, issued Apr. 17, 1979, to Eakman et al., U.S. Pat. No. 4,318,723, issued Mar. 9, 1982, to Holmes et al, U.S. Pat. No. 4,370,156, issued Jan. 25, 1983, to Goddin et al, and U.S. Application Ser. No. 532,343, filed Sept. 15, 1983 to the inventors herein.

Eakman et al discloses a process for separating carbon dioxide from methane in a single distillation column. If insufficient hydrogen is present in the column feedstream, hydrogen is added to provide a concentration from about 6 to 34 mole percent, preferably from about 20 to about 30 mole percent. The separation is said to take place without the formation of solid carbon dioxide. The tower pressure is preferably held between 1025 and 1070 psia.

Holmes et al adds alkanes having a molecular weight higher than methane, preferably butane, to the tower feed to increase the solubility of carbon dioxide and decrease its freezing temperature line. The additive n-butane is added in an amount from about 5 moles to 30 moles per 100 moles of feed.

Goddin et al uses a lean oil absorbent, preferably containing butanes and pentanes, to absorb carbon dioxide from a gas mixture, to prevent the formation of solid carbon dioxide in the absorber apparatus, to prevent the formation of an azeotrope of carbon dioxide with ethane, and to enhance the separation of any hydrogen sulfide from carbon dioxide.

Valencia et al teaches the addition of a light gas, such as helium, to a cryogenic distillation tower to raise the critical pressure of the carbon dioxide-methane mixture therein and allow distillation at a pressure above the critical pressure of methane while avoiding the formation of solid carbon dioxide.

As illustrated by the previous references, the distillative separation of methane and carbon dioxide has heretofore been hindered by the existence of solid carbon dioxide in equilibrium with vapor-liquid mixtures of carbon dioxide and methane at particular conditions of temperature, pressure and composition. Formation of solid carbon dioxide plugs currently employed distillation equipment. Therefore, it has been the teaching that the formation of solid carbon dioxide should be avoided in a fractional distillation process. As discussed above, solid carbon dioxide formation has been avoided by stopping the fractional distillation process before product streams of desired purity were produced requiring further separation by other means. Solid carbon dioxide formation has also been avoided by adding a third component to the fluids being separated by distillation requiring subsequent removal of such third component. Therefore, the need exists for a distillative methane-carbon dioxide separation process which can achieve desired product purity without avoiding solid carbon dioxide formation or adding a third component to the separation process.

SUMMARY OF THE INVENTION

This invention relates generally to a method and means for separating carbon dioxide and other acid gases from methane in a separation means employing both distillation and a freezing zone. Specifically, the method of the invention entails at least two steps. The first step comprises maintaining a distillation zone engineered to produce at least a freezing zone vapor feedstream. The second step comprises maintaining a freezing zone engineered to contact the freezing zone vapor feedstream with at least one liquid feedstream whereby both solids containing carbon dioxide and a methane-enriched vapor stream are formed. The distillation zone, not including the freezing zone, may be similar to those currently used in the art. The freezing zone is designed to control the formation and melting of solids and to prevent the introduction of solids from the freezing zone into the distillation zone.

The process is suitable for methane gas streams containing very large concentrations even in excess of 80% of carbon dioxide. The process is operable down to very small amounts of carbon dioxide but is most desirably used on feedstreams containing at least 10% carbon dioxide. A feedstream may contain hydrogen sulfide or other acid gases but it must be dried prior to introduction into the distillation tower.

The disclosed process may be used on a stand alone basis for a dried gas stream from a wellhead or may be used as an add-on process to other physical or chemical processes which are used to separate carbon dioxide and methane.

DESCRIPTION OF THE PREFERRED EMBODIMENTS

Figure 1:
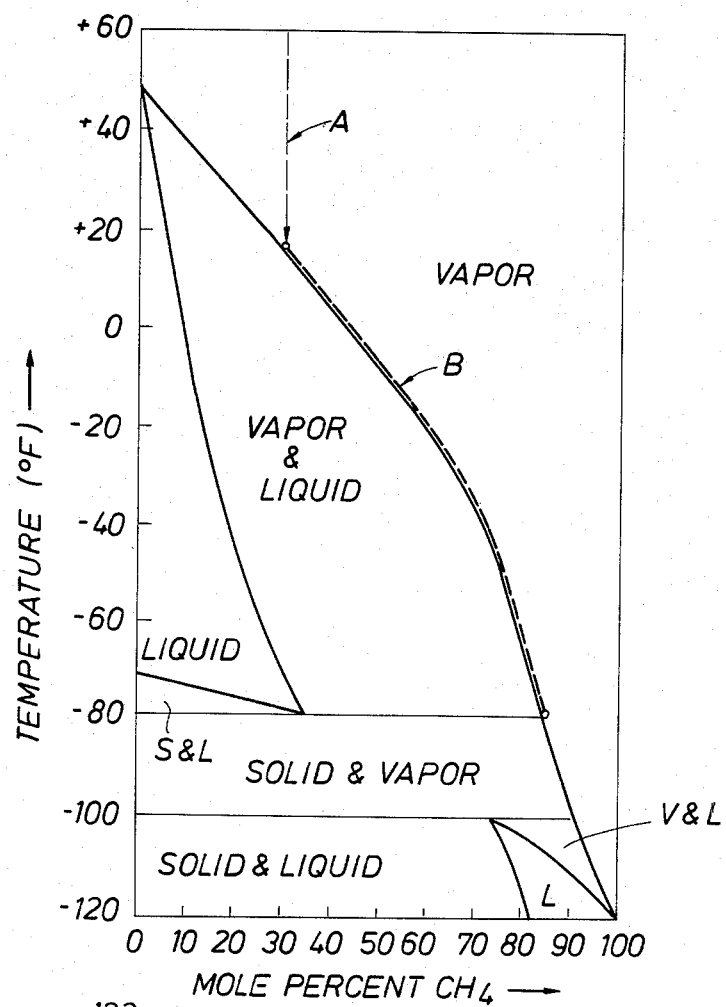
FIG. 1 is a binary phase diagram for methane and carbon dioxide as a function of temperature at 650 psia.

As mentioned above, one phenomenon which heretofore has been considered a problem in performing the cryogenic distillation of carbon dioxide and methane lies in the formation of carbon dioxide solids in the distillation tower. This is illustrated in FIG. 1, which is a binary phase diagram of carbon dioxide and methane at 650 psia. This diagram is based on data from H. G. Donnelly, and D. L. Katz, Ind. Eng. Chem. 46,511 (1954). The diagram shows regions for the various phases of carbon dioxide: liquid only, vapor only, vapor and liquid existing together, and regions having solids existing with either vapor or liquid.

By way of illustration, FIG. 1 shows that the formation of carbon dioxide solids would be expected if separation of a carbon dioxide-methane mixture is attempted at 650 psia. For instance, cooling a 30% methane/70% carbon dioxide mixture initially at 60° F. along line "A" in FIG. 1 will cause liquid to form beginning at about 15° F. At this point, vapor-liquid equilibrium distillation may take place. In the methane enriching section, the vapor, at equilibrium with the liquid, would increase in methane content along line "B". As the temperature is lowered to about −80° F., solid dioxide would begin to form. Further methane enrichment of the vapor product stream cannot be achieved without the formation of solid carbon dioxide. Solid carbon dioxide renders conventional distillation tower internals inoperable. The references cited above in the Background of the Invention each teach to avoid the formation of solid carbon dioxide by one manner or another. Therefore at 650 psia, the product methane stream in the illustration would have as much as 15% carbon dioxide remaining in it.

Figure 2:
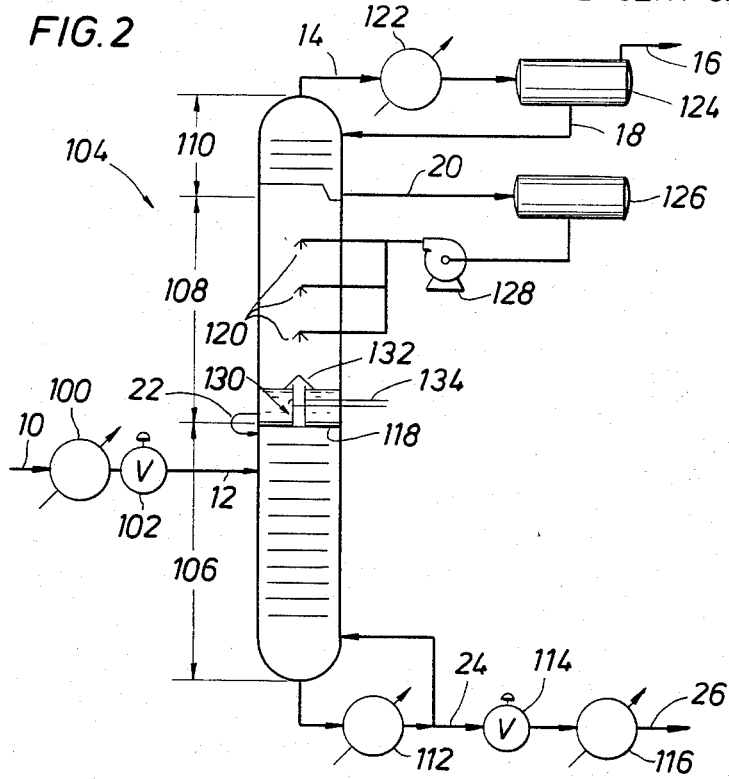
FIG. 2 is a schematic diagram of an example process unit using the present invention.

However, the disclosed process utilizes a controlled freezing zone which permits the solidification of carbon dioxide in a controlled manner rather than avoidance of those conditions where it forms. FIG. 2 illustrates, in schematic fasion, one desirable process exemplifying the concept of separating carbon dioxide from methane using just such a controlled freezing zone. TABLE I is approximate material balance showing the temperature and pressure at various points enumerated in FIG. 2.

TABLE I

CONTROLLED FREEZING ZONE ("CFZ") OPERATING CONDITIONS

Number of Theoretical Trays: 10*
Feed Tray: 5**
CFZ Section: Between trays 4 and 5
Reflux Ratio: 2.0

| Stream No. | Raw Gas 10 | Tower Feed 12 | Condenser Feed 14 | Overhead Product 16 | Reflux 18 | Sprays 20 | CFZ Liquid 22 | Bottoms Product 24 |
|---|---|---|---|---|---|---|---|---|
| Pressure (psia) | 600 | 550 | 550 | 550 | 550 | 550 | 550 | 550 |
| Temperature (°F.) | 100 | −62 | −128 | −129 | −129 | −124 | −53 | 36 |
| Flowrate (lb. mole/hr) | 21961 | 21961 | 53587 | 17844 | 35743 | 28599 | 6771 | 4117 |
| Composition (Mole %) | | | | | | | | |
| Nitrogen | 1.497 | 1.497 | 1.198 | 1.843 | 0.876 | 0.406 | 0.041 | — |
| Methane | 79.575 | 79.575 | 98.386 | 97.923 | 98.618 | 93.242 | 17.688 | 0.087 |
| $CO_2$ | 18.509 | 18.509 | 0.414 | 0.234 | 0.503 | 6.109 | 79.901 | 97.681 |
| $H_2S$ | 0.121 | 0.121 | 0.0004 | 0.0002 | 0.0005 | 0.021 | 0.484 | 0.644 |
| Ethane | 0.251 | 0.251 | 0.001 | — | 0.002 | 0.222 | 1.707 | 1.337 |
| Propane | 0.030 | 0.030 | — | — | — | — | 0.117 | 0.160 |

TABLE I-continued
CONTROLLED FREEZING ZONE ("CFZ") OPERATING CONDITIONS

| Iso-Butane | 0.017 | 0.017 | — | — | — | — | 0.062 | 0.091 |

*Does not include the condenser or the reboiler
**Tray numbering begins from top Dried gas stream from a wellhead at about 600 psia containing approximately 79.5% methane, 18.5% carbon dioxide, and the remainder other compounds, such as nitrogen, hydrogen sulfide, and other hydrocarbons, is introduced into the unit through line 10. This feed stream may be cooled in indirect heat exchanger 100 and expanded through Joule-Thompson ("J-T") valve 102. Precooler 100 and J-T valve 102 drop the pressure and temperature to a level suitable for introduction of a stream into the methane-carbon dioxide splitter tower 104. For the purposes of this illustration, the splitter tower 104 is operated at a pressure of 550 psia and the tower feed entering through line 12 is at a temperature of −62° F.

TABLE II shows an approximate characterization of the splitter tower 104 made by using an Exxon proprietary computer program based on well known chemical engineering principles.

TABLE II

| | Temperature °F. | VAPOR | | | LIQUID | | |
|---|---|---|---|---|---|---|---|
| | | Flow (lb. moles/hr) | Methane (Mole Fraction) | Carbon Dioxide (Mole Fraction) | Flow (lb. moles/hr) | Methane (Mole Fraction) | Carbon Dioxide (Mole Fraction) |
| Condenser | −129.0 | 17,844 | .9792 | .0023 | 35,743 | .9862 | .0050 |
| Tray 1 | −128.1 | 53,787 | .9838 | .0041 | 35,374 | .9853 | .0089 |
| Tray 2 | −127.5 | 53,218 | .9833 | .0067 | 34,666 | .9805 | .0146 |
| Tray 3 | −126.7 | 52,511 | .9800 | .0104 | 33,505 | .9719 | .0233 |
| Tray 4 | −125.6 | 51,350 | .9744 | .0160 | 31,673 | .9576 | .0372 |
| Spray | −123.7 | 49,517 | .9654 | .0246 | 28,599 | .9323 | .0611 |
| Tray 5 | −52.5 | 2,237 | .7268 | .2547 | 6,771 | .1769 | .7990 |
| Tray 6 | −11.1 | 2,654 | .4500 | .5225 | 7,518 | .0966 | .8761 |
| Tray 7 | 15.2 | 3,400 | .2125 | .7538 | 8,118 | .0440 | .9273 |
| Tray 8 | 27.5 | 4,001 | .0884 | .8760 | 8,432 | .0182 | .9536 |
| Tray 9 | 32.7 | 4,315 | .0347 | .9311 | 8,563 | .0071 | .9662 |
| Tray 10 | 34.9 | 4,446 | .0129 | .9561 | 8,607 | .0026 | .9729 |
| Reboiler | 36.0 | 4,489 | .0043 | .9691 | 4,117 | .0009 | .9771 |

N.B. The mole fraction of methane and carbon dioxide in this Example do not add up to 1.0 because of the presence of minor amounts of ethane, propane, isobutane, nitrogen, and hydrogen sulfide. The disposition of these constituents in the two tower products is, however, shown in TABLE I.

Splitter tower 104 is desirably separated into three distinct sections. The lower distillation section 106, middle controlled freezing zone 108, and an upper distillation section 110. The tower feed, as mentioned above, is introduced into the lower distillation section 106 through line 12 where it undergoes typical distillation. The internals of lower section 106 may include suitable trays, downcomers, and weirs, as are suitable for separating a carbon dioxide-methane mixture. Lower section 106 may instead be packed with known tower packing means. Liquid carbon dioxide product leaves the bottom of the section, is heated in reboiler 112, and a portion is returned to the tower as reboiled liquid. The remainder leaves the process as a product via line 24. This stream is quite versatile in that it may be flashed in J-T valve 114 and its refrigeration values utilized elsewhere in the unit in the manner illustrated by heat exchanger 116.

In the lower distillation section 106, the lighter vapors leave this distillation section via chimney tray 118. Once in controlled freezing zone 108, those vapors contact the liquid spray emanating from nozzles or spray jet assemblies 120. The vapor then continues up through the upper distillation section 110 where it contacts reflex introduced to the tower through line 18. Vapor leaves tower 104 through line 14, is partially condensed in reflux condenser 122 and is separated into liquid and vapor phases in reflux drum 124. Liquid from reflux drum 124 is returned to the tower via line 18. The vapor from the drum is taken off as a product in line 16 for subsequent sale to a pipeline or condensation as LNG.

The liquid produced in upper distillation section 110 is collected and withdrawn from the tower via line 20. Liquid in line 20 may be accumulated in vessel 126 and returned to the controlled freezing zone using pump 128 and spray nozzles 120. The vapor rising through chimney tray 118 meets the spray emanating from nozzles 120. Solid carbon dioxide forms and falls to the bottom of controlled freezing zone 108. Chimney tray 118 is, of course, made up of a central chimney 130 and a hat 132. A level of liquid (possibly containing some melting solids) is maintained in the bottom of controlled freezing zone 108. The temperature is controlled by heater 134. The heater may use the heat available in product line 26. Alternatively, heater 134 may be electric or use any other suitable and available heat source. Heater 134 may be external to the tower. It is contemplated that under most conditions operation of heater 134 will not be required. In any event, liquid flows down from the bottom of controlled freezing zone 108 through exterior line 22 into the upper end of bottom distillation section 106. Heater 134 insures that no solids leave the controlled freezing zone via line 22 to plug the distillation trays found in the lower distillation section.

It is contemplated that in certain circumstances, the upper distillation zone may not be needed, or at least, not desired. In such an instance, at least a portion of the vapor leaving the controlled freezing zone 108 would be condensed and returned in line 20 as liquid feed to the nozzles.

Figure 3:
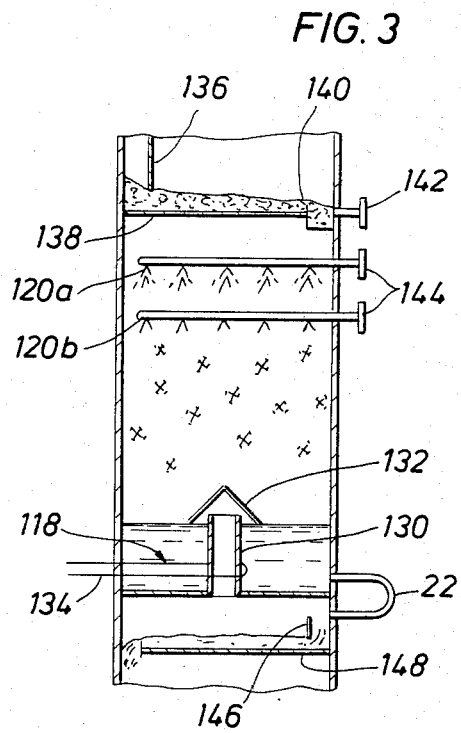
FIG. 3 is a schematic cutaway of the middle section of the distillation device in FIG. 2.

FIG. 3 shows the controlled freezing zone 108 of splitter tower 104 in more detail. Beginning at the top of the section, bottom portion of the downcomer 136 is shown at the top of FIG. 3. It is located in the bottom of upper distillation section 110. Tray 138 has an appropriate bubble forming device to insure contact between the downcoming liquid and the upcoming vapor. Tray 138 also has weir 140 to provide a level of liquid on the tray. The downcomer area of tray 138, however, is sealed and the liquid is taken out through nozzle 142 which forms a portion of line 20 (see FIG. 2). Alternatively, a chimney tray may be used instead of tray 138 and weir 140. In either case, the liquid leaves through flanged nozzle 142 and is taken to the accumulator and pump mentioned above with respect to FIG. 2. The pump returns the liquid through upper spray nozzle assembly 120a or lower spray nozzle assembly 120b; the nozzle arrays may have flanges such as those shown at 144. These sprays are used to spray the cold methane-rich liquid into the top of the controlled freezing zone. Vapor going past the bottom spray assembly 120b would no longer be able to form solid carbon dioxide due to its cold temperature and its enrichment in methane. To be conservative, a second spray nozzle assembly 120a may be used for additional contact prior to allowing the vapors into the upper distillation section of the tower. As mnetioned above, the upper distillation section 110 may not always be necessary. The vapor leaving the spray 120a region may be pure enough (around 2% carbon dioxide) to meet pipeline quality standards. However if the produce methane is to be used as LNG or if it is to be sent to a cryogenic nitrogen rejection unit for additional treatment, then further purification on the upper trays may be desired.

In any event, the solidification of carbon dioxide into a form resembling snow requires good contact between the rising vapor and the liquid sprayed from the assemblies. Consequently, the spray nozzle size should be carefully chosen to produce small liquid droplets. Booster pump (see 128 in FIG. 2) may be necessary to overcome the pressure drop in the spray nozzles in nozzle assembly 120a and 120b.

As noted above, the chimney tray assembly 118 located between controlled freezing zone 108 and lower distillation section 106 is made up of the chimney itself 130 and the hat 132. Chimney hat 132 prevents the solid carbon dioxide particles or flakes from falling to the lower distillation zone. Line 22 takes liquid from chimney tray 118 and brings it down to the vapor-liquid contact devices or packing used in the lower distillation section 106. Baffle 146 may be used at the discharge of line 122 to allow the formation of a relatively undisturbed liquid level on upper tray 148.

For the specific example shown herein, it is contemplated that control of the controlled freezing zone may be based on several temperatures and liquid levels. First, the temperature at the bottom of the controlled freezing zone liquid layer found on chimney tray 118 should be maintained within a few degrees (about 5° F.) above the highest temperature at which carbon dioxide can freeze at the operating column pressure. This is achieved by adding heat to the liquid near the bottom of the controlled freezing zone by heater 134 as necessary. Second, the liquid level at the bottom of the controlled freezing zone is maintained at a constant predetermined depth by adjusting the flow rate of the stream flowing in line 22. Third, the temperature at the top spray 120a is maintained a few degrees colder (around 3° to 5° F.) than the coldest temperature at which carbon dioxide can freeze under the operating column pressure. Finally, the proper control of the overhead product purity in line 14 (see FIG. 2), as well as that of the temperature at the top of the controlled freezing zone, is achieved by setting the overhead product temperature through reflux condenser 122 and by adjusting the reflux rate through line 18. It should be apparent that the flow to the sprays is directly related to the reflux rate.

Further, although the feedstream in the Example is introduced into the lower distillation section, it is contemplated that other feed sites may be appropriate. For instance, a feedstream may be introduced into the controlled freezing zone as a vapor or as a liquid to the chimney tray liquid or as a liquid (or mixture of gas or liquid) to a spray nozzle assembly. The feedstream introduction point is chosen in much the same manner as it would be in a typical distillation tower.

Figure 4:
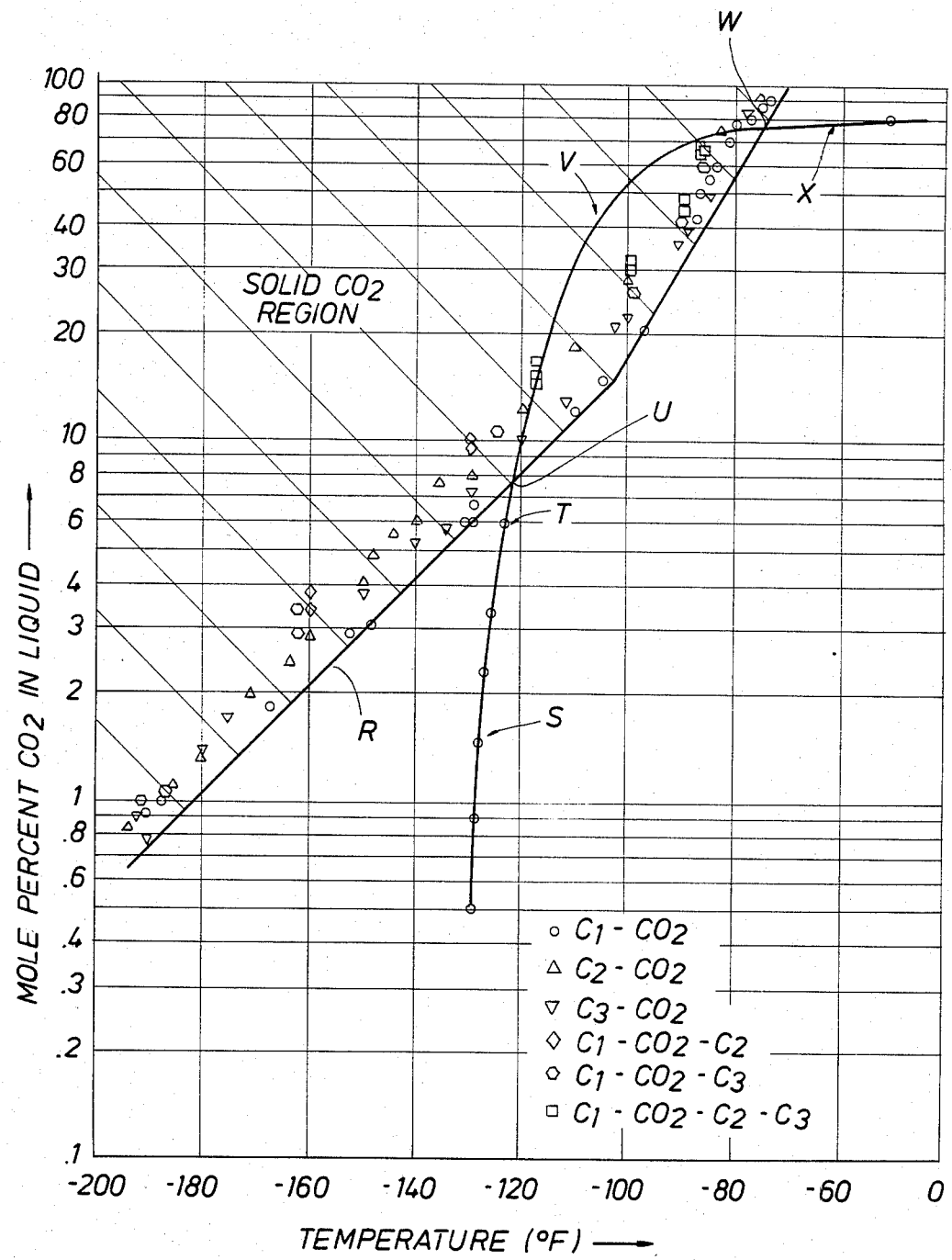
FIG. 4 is a temperature-liquid carbon dioxide fraction diagram showing the operation of the separation device exemplified in FIGS. 2 and 3.

FIG. 4 illustrates the operating line of the previous Example on a chart showing the solubility of carbon dioxide in the liquid phase as a function of temperature. For the Example shown in FIGS. 2 and 3 and TABLES I and II, the operating line for the splitter tower 104 crosses line "R", which conservatively represents the formation of solid carbon dioxide. Hence, carbon dioxide in the upper end of the tower is in the solid free region of the chart at "S". The sprays desirably are operated at a point denoted as point "T" and the operating line crosses into the solid carbon dioxide region at point "U". The controlled freezing zone is the portion of the line "V" between point "U" and point "W". The liquid flowing down into the lower distillation region is partially shown at line "X". The data used to produce line "R" are known from the literature: H. Cheung and E. H. Zander, "Solubility of Carbon Dioxide and Hydrogen Sulfide in Liquid Hydrocarbons at Cryogenic Temperatures," *Chemical Engineering Progress Symposium* Ser. No. 88, Vol. 64, 1968, and F. Kurata, "Solubility of Carbon Dioxide in Pure Light Hydrocarbons and Mixtures of Light Hydrocarbons," (GPA Research Report RR-10, February, 1974).

Where the prior art has avoided the production of solid carbon dioxide in separating carbon dioxide from methane as counterproductive, the disclosed process takes advantage of the phenomenon by freezing the carbon dioxide in a clearly controlled fasion. The advantages offered by this process and accompanying equipment involve the elimination of solvents or additives, corresponding reduction in numbers of equipment pieces and complexity of their operation, and the production of a high pressure liquid carbon dioxide stream.

The above description and example of the invention are offered only for the purpose of illustration, and is not intended that the invention be limited except by the scope of the appended claims.

What we claim as our invention:

1. A method for the separation of a feedstream containing methane and carbon dioxide comprising the steps of:
    maintaining a first distillation zone engineered to produce an enriched carbon dioxide liquid bottoms stream and a freezing zone vapor feedstream and operated at a temperature and pressure at which substantially no carbon dioxide solids are formed within said distillation zone,
    maintaining a freezing zone engineered to contact said freezing zone vapor feedstream with at least one freezing zone liquid feedstream containing methane at a temperature and pressure whereby both solids-containing carbon dioxide and a methane-enriched vapor stream are formed in said freezing zone,
    introducing said feedstream into said first distillation zone, producing said enriched carbon dioxide and said freezing zone vapor feedstream, introducing said freezing zone vapor feedstream into said freezing zone, contacting in said freezing zone said freezing zone vapor feedstream with at least one said freezing zone liquid feedstream, forming in said freezing zone said solids containing carbon dioxide and said methane-enriched vapor stream, melting said solids containing carbon dioxide and introducing a liquid stream containing said melted solids into said first distillation zone, condensing at least a portion of the methane-enriched vapor stream and forming said at least one freezing zone liquid feedstream with at least a portion of said condensed vapor stream, and recovering at least a portion of the remainder of the methane-enriched vapor stream as a methane-enriched product stream.

2. The method of claim 1 wherein said solids containing carbon dioxide in the freezing zone are melted by adding heat.

3. The method of claim 2 wherein said heat is added through indirect heat exchanger means placed within the freezing zone.

4. The method of claim 2 wherein said heat is added through electrical heating means placed within the freezing zone.

5. The method of claim 1 wherein said at least one freezing zone liquid feedstream is introduced through spray means placed within said freezing zone.

6. The method of claim 5 wherein said spray means comprise one or more separate spray nozzle assemblies.

7. The method of claim 5 wherein said at least one freezing zone liquid feedstream is pumped through said spray means.

8. The method of claim 1 wherein said separation means comprises a single vertical vessel having the first distillation zone in its lower portion and the freezing zone in an upper portion.

9. The method of claim 1 additionally comprising the step of recovering at least a portion of the refrigeration heat value from the enriched carbon dioxide liquid bottoms stream.

10. A method for the separation of a feedstream containing methane and carbon dioxide in separation means comprising the steps of:

maintaining a first distillation zone engineered to produce an enriched carbon dioxide liquid bottoms stream and a freezing zone vapor feedstream and operated at a temperature and pressure at which substantially no carbon dioxide solids are formed within said distillation zone, maintaining a freezing zone engineered to contact said freezing zone vapor feedstream with at least one freezing zone liquid feedstream containing methane at a temperature and pressure whereby both solids containing carbon dioxide and a methane-enriched vapor stream are formed, introducing said feedstream into said first distillation zone, producing said enriched carbon dioxide and said freezing zone vapor stream, introducing said freezing zone vapor feedstream into said freezing zone, contacting in said freezing zone said vapor feedstream with at least one said freezing zone liquid feedstream, forming in said freezing zone said solids containing carbon dioxide and said methane-enriched vapor stream, melting said solids containing carbon dioxide and introducing a liquid stream containing said melted solids into said first distillation zone, maintaining a second distillation zone engineered to produce at least one said freezing zone liquid feedstream and an overhead vapor stream and operated at a temperature and a pressure at which substantially no carbon dioxide solids are produced within said second distillation zone, condensing at least a portion of the overhead vapor stream and recycling at least a portion of said condensed overhead vapor stream as reflux in said second distillation zone, and recovering at least a portion of the remainder of the overhead vapor stream as a methane-enriched product stream.

11. The method of claim 10 wherein said solids containing carbon dioxide in the freezing zone are melted by adding heat.

12. The method of claim 11 wherein said heat is added through indirect heat exchanger means placed within the freezing zone.

13. The method of claim 11 wherein said heat is added through electrical heating means placed within the freezing zone.

14. The method of claim 10 wherein said at least one freezing zone liquid feedstream is introduced through spray means placed within said freezing zone.

15. The method of claim 14 wherein said spray means comprise one or more separate spray nozzle assemblies.

16. The method of claim 14 wherein said at least one freezing zone liquid feedstream is pumped through said spray means.

17. The method of claim 10 wherein said separation means comprises a single vertical vessel having the first distillation zone in a lower portion and the freezing zone in a middle portion and said second distillation zone in an upper portion.

18. The method of claim 10 additionally comprising the step of recovering at least a portion of the refrigeration heat value from the enriched carbon dioxide liquid bottoms stream.

19. A method for separation of a feedstream containing methane and carbon dioxide comprising the steps of:

maintaining a first distillation zone engineered to produce an enriched liquid carbon dioxide bottoms stream and a first distillation zone vapor stream, maintaining a freezing zone engineered to contact said feedstream with said first distillation zone vapor stream at a temperature and pressure whereby both solids containing carbon dioxide and a methane-enriched vapor stream are formed, introducing said feedstream into the freezing zone, introducing said first distillation zone vapor stream into said freezing zone, contacting in said freezing zone said first distillation zone vapor stream with said feedstream, producing in said freezing zone said solids containing carbon dioxide and said methane-enriched vapor stream, condensing at least a portion of the methane-enriched vapor stream and forming at least one freezing zone reflux feedstream with at least a portion of said condensed vapor stream, recovering at least a portion of the remainder of the methane-enriched vapor stream as a methane-enriched product stream, melting said solids containing carbon dioxide, introducing a liquid stream containing said melted solids into said first distillation zone, and distilling said liquid stream in said first distillation zone at a temperature and pressure at which substantially no carbon dioxide solids are formed within said distillation zone, and recovering at least a portion of said enriched liquid carbon dioxide bottoms stream as a carbon dioxide-enriched product stream.

20. The method of claim 19 wherein said feedstream is vapor.

21. The method of claim 19 wherein said feedstream is mixed vapor and liquid.

22. The method of claim 19 wherein said feedstream is liquid.

23. The method of claim 22 wherein said feedstream is liquid and at least a portion is mixed with said liquid stream containing melted carbon dioxide solids to produce a mixed stream and introducing said mixed stream into said first distillation zone.

24. The method of claim 22 wherein said feedstream is liquid and at least a portion of said feedstream and said at least one freezing zone reflux feedstream are introduced into said freezing zone through spray means placed in said freezing zone.

25. The method of claim 24 wherein said spray means comprise one or more separate spray nozzle assemblies.

26. The method of claim 24 wherein said at least one freezing zone reflux feedstream is pumped through said spray means.

27. The method of claim 19 wherein said at least one freezing zone reflux feedstream in introduced into said freezing zone through spray means placed in said freezing zone.

28. The method of claim 27 wherein said spray means comprise one or more separate spray nozzle assemblies.

29. The method of claim 27 wherein said at least one freezing zone reflux feedstream is pumped through said spray means.

30. The method of claim 19 wherein said solids containing carbon dioxide in the freezing zone are melted by adding heat.

31. The method of claim 30 wherein said heat is added through said indirect heat exchanger means placed within said freezing zone.

32. The method of claim 30 wherein said heat is added through electrical heating means placed within said freezing zone.

33. The method of claim 19 wherein said separation means comprises a single vertical vessel having the first distillation zone in a lower portion and the freezing zone in an upper portion.

34. The method of claim 19 additionally comprising the step of recovering at least a portion of the refrigeration heat value from the enriched carbon dioxide liquid bottoms stream.

35. A method for the separation of a feedstream containing methane and carbon dioxide comprising the steps of:

maintaining a first distillation zone engineered to produce an enriched carbon dioxide bottoms stream and a first distillation zone vapor stream, maintaining a second distillation zone engineered to produce at least one second distillation zone liquid stream and a methane-enriched overhead vapor stream, maintaining a freezing zone engineered to contact said feedstream and said second distillation zone liquid stream with said first distillation zone vapor stream and operated at a temperature and pressure whereby both solids containing carbon dioxide and a freezing zone vapor stream are formed, introducing said feedstream, said second distillation zone liquid stream and said first distillation zone vapor stream into the freezing zone, contacting said feedstream and said second distillation zone liquid stream with said first distillation zone vapor stream, producing in said freezing zone solids containing carbon dioxide and a freezing zone vapor stream, melting said solids containing carbon dioxide, introducing a liquid stream containing said melted solids into said first distillation zone, and distilling said liquid stream in said first distillation zone at a temperature and pressure at which substantially no carbon dioxide solids are formed within said distillation zone, recovering at least a portion of said enriched liquid carbon dioxide bottoms stream as a carbon dioxide-enriched product stream, introducing said freezing zone vapor stream into said second distillation zone, which zone is operated at a temperature and pressure at which substantially no carbon dioxide solids are produced within said second distillation zone, condensing at least a portion of the methane-enriched overhead vapor stream and recycling at least a portion of said condensed overhead vapor stream as reflux in said second distillation zone, and recovering at least a portion of the remainder of the overhead vapor stream as a methane-enriched product stream.

36. The method of claim 35 wherein said feedstream is vapor.

37. The method of claim 35 wherein said feedstream is mixed vapor and liquid.

38. The method of claim 35 wherein said feedstream is liquid.

39. The method of claim 38 wherein said feedstream is liquid and at least a portion is mixed with said liquid stream containing melted carbon dioxide solids to produce a mixed stream and introducing said mixed stream into said first distillation zone.

40. The method of claim 38 wherein said feedstream is liquid and at least a portion of said feedstream and said at least one second distillation zone liquid stream are introduced into said freezing zone through spray means placed in said freezing zone.

41. The method of claim 40 wherein said spray means comprise one or more separate spray nozzle assemblies.

42. The method of claim 40 wherein said at least one second distillation zone liquid stream is pumped through said spray means.

43. The method of claim 35 wherein said at least one second distillation zone liquid stream is introduced into said freezing zone through spray means placed in said freezing zone.

44. The method of claim 43 wherein said spray means comprise one or more separate spray nozzle assemblies.

45. The method of claim 43 wherein said at least one second distillation zone liquid stream is pumped through said spray means.

46. The method of claim 35 wherein said solids containing carbon dioxide in the freezing zone are melted by adding heat.

47. the method of claim 46 wherein said heat is added through said indirect heat exchanger means placed within said freezing zone.

48. The method of claim 46 wherein said heat is added through electrical heating means placed within said freezing zone.

49. The method of claim 35 wherein said separation means comprises a single vertical vessel having the first distillation zone in a lower portion and the freezing zone in a middle portion and the second distillation zone in an upper portion.

50. The method of claim 35 additionally comprising the step of recovering at least a portion of the refrigeration heat value from the enriched dioxide liquid bottoms stream.

51. Means suitable for separating a feedstream containing methane and carbon dioxide comprising:
 a first lower distillation section having an upper end and a lower end and containing vapor-liquid contact means, outlet means in the lower end of the section suitable for allowing liquids to exit said section, means for allowing reboiled liquid to enter the lower end, means for allowing liquids to enter the upper end of the section from a freezing section, and means for allowing vapor to exit the first lower distillation section into the freezing section while maintaining a liquid level within a lower end of said freezing section, and
 a freezing section engineered to contact vapor from first lower distillation section with liquid to produce both solids containing carbon dioxide and methane-enriched vapor, said freezing section having an upper end and a lower end and containing spray means suitable for introducing a liquid into said section in a spray, and means for allowing said methane-enriched vapor to exit the upper end of the freezing section.

52. The separation means of claim 51 additionally comprising feedstream introduction means in said first lower distillation section.

53. The separation means of claim 52 wherein said feedstream introduction means is in the upper end of said first lower distillation section.

54. The separation means of claim 51 additionally comprising feedstream introduction means in said freezing section.

55. The separation means of claim 54 wherein said feedstream introduction means comprise spray means.

56. The separation means of claim 51 wherein the vapor-liquid contact means are distillation trays.

57. The separation means of claim 51 wherein the vapor-liquid contact means are packing.

58. The separation means of claim 51 also including a reboiler adapted to heat liquids exiting the first lower distillation section from said outlet means and returning said reboiled liquids through said means for allowing reboiled liquids to enter the lower end of the first lower distillation section.

59. The separation means of claim 51 wherein said means for allowing vapor to exit the first lower distillation section into the freezing section comprise a chimney tray.

60. The separation means of claim 51 also comprising heating means situated in the vicinity of the means for allowing vapor to exit the first lower distillation means which heating means are suitable for melting frozen solids which may be produced in said freezing section.

61. The separation means of claim 51 wherein the spray means comprise one or more levels of spray assemblies.

62. The separation means of claim 51 additionally comprising a second upper distillation section having an upper end and a lower end and containing vapor-liquid contact means, inlet means in the upper end of the second upper distillation section for allowing reflux liquids to contact the vapor-liquid contact means in said second upper distillation section, means in the lower end of said second distillation section for collecting liquids and allowing those liquids to exit the second distillation zone, and means for allowing vapor to enter said upper distillation section from said freezing section.

63. The separation means of claim 62 wherein said means for allowing vapor to enter second distillation section from said freezing section comprise a chimney tray.

64. The separation means of claim 62 additionally comprising feedstream introduction means in said first lower distillation section.

65. The separation means of claim 64 wherein said feedstream introduction means is in the upper end of said first lower distillation section.

66. The separation means of claim 62 additionally comprising feedstream introduction means in said freezing section.

67. The separation means of claim 66 wherein said feedstream introduction means comprise spray means.

68. The separation means of claim 62 additionally comprising pump means for transporting liquid from the liquid collection means in the lower end of the second distillation zone to the spray means in the freezing zone.

69. The separation means of claim 62 wherein the vapor-liquid contact means in the second distillation zone are distillation trays.

70. The separation means of claim 62 wherein the vapor liquid contact means in the second distillation zone are packing.

71. The separation means of claim 62 also including a reboiler adapted to heat liquids exiting the first lower distillation section from said outlet means and returning said reboiled liquids through said means for allowing reboiled liquids to enter the lower end of the first lower distillation section.

72. The separation means of claim 62 wherein said means for allowing vapor to exit the first lower distillation section into the freezing section comprise a chimney tray.

73. The separation means of claim 62 also comprising heating means situated in the vicinity of the means for allowing vapor to exit the first lower distillation means which heating means are suitable for melting frozen solids which may be produced in said freezing section.

74. The separation means of claim 62 wherein the spray means comprise one or more levels of spray assemblies.

75. The separation means of claim 62 wherein said separation means comprises a generally cylindrical vertical tower having an upper end and a lower end and where said first lower distillation section is situated towards the lower end, the second upper distillation section is situated towards the upper end and the freezing section is situated between said first lower and second upper distillation sections.

76. The separation means of claim 51 wherein said separation means comprises a generally cylindrical vertical tower having an upper end and a lower end and where said first lower distillation section is situated towards the lower end and the freezing section is situated towards said upper end.

* * * * *